United States Patent
Su et al.

(10) Patent No.: US 9,756,285 B2
(45) Date of Patent: Sep. 5, 2017

(54) METHOD, DEVICE, AND DISPLAY DEVICE FOR SWITCHING VIDEO SOURCE

(71) Applicant: ZTE Corporation, Shenzhen (CN)

(72) Inventors: Xianxu Su, Shenzhen (CN); Peng Ding, Shenzhen (CN); Mingliang Wu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/909,145

(22) PCT Filed: Apr. 14, 2014

(86) PCT No.: PCT/CN2014/075309
§ 371 (c)(1),
(2) Date: Mar. 8, 2016

(87) PCT Pub. No.: WO2014/169796
PCT Pub. Date: Oct. 23, 2014

(65) Prior Publication Data
US 2016/0173818 A1    Jun. 16, 2016

(30) Foreign Application Priority Data
Aug. 15, 2013 (CN) .......................... 2013 1 0356699

(51) Int. Cl.
H04N 7/14 (2006.01)
H04N 7/15 (2006.01)
G06F 3/0482 (2013.01)
G06F 3/0484 (2013.01)
H04N 5/268 (2006.01)

(52) U.S. Cl.
CPC ........... *H04N 7/147* (2013.01); *G06F 3/0482* (2013.01); *G06F 3/04842* (2013.01); *H04N 5/268* (2013.01); *H04N 7/15* (2013.01)

(58) Field of Classification Search
USPC ... 348/14.01, 14.07, 333.01, 333.02, 333.05, 348/333.12, 569
See application file for complete search history.

(56) References Cited

U.S. PATENT DOCUMENTS 5,365,276 A * 11/1994 Imai ..................... H04N 7/0122
348/556
8,416,279 B2   4/2013 Pepperell
(Continued)

FOREIGN PATENT DOCUMENTS

| CN | 101959051 A | 1/2011 |
| CN | 102265613 A | 11/2011 |
| CN | 102301736 A | 12/2011 |
| KR | 20120023318 A | 3/2012 |

OTHER PUBLICATIONS

International Search Report in international application No. PCT/CN2014/075309, mailed on Aug. 4, 2014.
(Continued)

*Primary Examiner* — Yosef K Laekemariam
(74) *Attorney, Agent, or Firm* — Oppedahl Patent Law Firm LLC (57) ABSTRACT

Provided are a method, device, and a display device for switching video source. The method comprises: detecting and finding at least one currently available video source; displaying the video source in a video source list in the form of thumbnails, obtaining a video source selection event, switching to the selected video source from the video source list as the current video source, and displaying said video source. The present invention can at least solve the problems of low switching efficiency and abnormal switching.

11 Claims, 3 Drawing Sheets

(56) References Cited

U.S. PATENT DOCUMENTS

| | | | |
|---|---|---|---|
| 8,713,439 B2* | 4/2014 | Blinnikka | G06F 3/04817 715/203 |
| 2006/0215765 A1 | 9/2006 | Hwang | |
| 2007/0263076 A1 | 11/2007 | Andrews | |
| 2008/0068447 A1 | 3/2008 | Mattila | |
| 2010/0157017 A1 | 6/2010 | Pepperell | |
| 2012/0066596 A1 | 3/2012 | Feng | |
| 2013/0194378 A1 | 8/2013 | Brown | |
| 2014/0089802 A1 | 3/2014 | Wang | |

OTHER PUBLICATIONS

English Translation of the Written Opinion of the International Search Authority in international application No. PCT/CN2014/075309, mailed on Aug. 4, 2014.

Supplementary European Search Report in European application No. 14785004.4, mailed on Jul. 6, 2016.

Julie Perry: "You Tube Change: No More You Tube Video Thumbnail Control!", Internet Citation, Dec. 3, 2008 (Dec. 3, 2008), pp. 1/2-2/2, XP002604855,Retrieved from the Internet:URL:http://www.youtubesecretweapon.com/blog/youtube-change-no-more-youtube-video-thu mbnai1-control/ [retrieved on Oct. 13, 2010].

& Megan O'Neill: "The Complete Guide to You Tube Play lists", Internet Citation, Oct. 21, 2010 (Oct. 21, 2010), p. 2, XP002720039,Retrieved from the Internet: URL: http ://social times.com / you tube-play lists_b25853 [retrieved on Feb. 10, 2014].

* cited by examiner

METHOD, DEVICE, AND DISPLAY DEVICE FOR SWITCHING VIDEO SOURCE

TECHNICAL FIELD

The disclosure relates to the field of videoconference, and in particular to a method and device for video source switching, and a displaying device.

BACKGROUND

Videoconference refers to a communication technology for transmitting audio and video streams through a communication network using television and dedicated equipment, such that conference rooms respectively at two or more places thousands of miles apart may be connected for holding a real-time, bi-directional, interactive visualized conference by way of television. A videoconference system can convey, in real time, an image and a voice of a conferee, as well as conference data, charts and an image of a related object, such that participants at different places may hear and see each other, as if they were in the same conference room. Such a videoconference technology of conveying information such as video, audio, data, etc. using a network may completely replace an on-site conference in effect. Various conferences held by way of videoconference may save a lot of resources and money for conference organizers. In a modern era with developed network communication, videoconference has become an indispensable conference product.

During implementing a technical solution according to an embodiment herein, the inventor of the present disclosure finds technical problems in existing art as follows.

In an existing videoconference system, a user may see, through multiple pictures, images of other online users in a conference, such that videoconference can display images of multiple users attending the conference more clearly in addition to providing closer communication. However, with increasing capacity of accessing video sources, it is rather inconvenient regarding video source switching with existing videoconference. For example, a, it is inconvenient to perform a real-time switching operation where a menu is set, leading to a low switching efficiency; b, when switching is to be performed among a lot of available video sources, in existing displaying art, the video sources can be displayed only as icons. In this case, the user may not know which video source displays which stream, which will lead to confusion in video source switching, leading to abnormal switching.

SUMMARY

Embodiments herein may provide a method and device for video source switching, and a displaying device, capable of increasing a switching efficiency and reducing abnormal switching.

To this end, a technical solution according to an embodiment herein may be implemented as follows.

A method for video source switching includes:
  detecting at least one video source presently available;
  displaying the at least one video source as a list of video sources in forms of thumbnails; acquiring an event of selecting a video source from the list of video sources, switching a present video source to the video source selected from the list of video sources, and displaying the present video source.

The at least one video source presently available may be detected by:
  detecting the at least one video source input respectively through at least one corresponding video interface. The at least one video source may include at least one of a Video Graphics Array (VGA) input source, a High Definition Multimedia Interface (HDMI) input source, and a Graphical User Interface (GUI) video input source.

The at least one video source may be displayed as a list of video sources in forms of thumbnails by:
  acquiring the detected at least one video source and video information corresponding to the at least one video source;
  generating the thumbnails according to the video information corresponding to the at least one video source, and displaying the list of video sources in forms of the thumbnails.

The thumbnails may be generated according to the video information corresponding to the at least one video source, and the list of video sources may be displayed in forms of the thumbnails by:
  in case that the thumbnails are to be generated according to a video stream included in the video information, when a video stream of a video source in the at least one video source is being output normally, generating a thumbnail corresponding to the video source in the at least one video source, and displaying the thumbnail in the list of video sources; when a video stream of a video source in the at least one video source is not being output normally, setting a thumbnail corresponding to the video source in the at least one video source as an icon illustrating content of the video source, and displaying the thumbnail in the list of video sources.

The event of selecting the video source from the list of video sources may be acquired, the present video source may be switched to the video source selected from the list of video sources, and then displayed, by:
  acquiring the event of selecting the video source from the list of video sources by clicking on a thumbnail corresponding to the video source, switching the present video source to the selected video source, and displaying the present video source in a video picture of a present participant;
  or,
  acquiring the event of selecting the video source from the list of video sources by dragging a thumbnail corresponding to the video source, switching the present video source to the selected video source, and displaying the present video source in a video picture of a present participant.

A device for video source switching is located in an electronic displaying equipment. The electronic displaying equipment may include a display screen of a touch type or a non-touch type. The device for video source switching may include:
  a detecting module configured for: detecting at least one video source presently available;
  a displaying module configured for: receiving the at least one video source reported by the detecting module, displaying the at least one video source as a list of video sources in forms of thumbnails; acquiring an event of selecting a video source from the list of video sources, switching a present video source to the video source selected from the list of video sources, and displaying the present video source.

In processing, the detecting module and the displaying module may be implemented using a Central Processing Unit (CPU), a Digital Signal Processor (DSP), or a Field-Programmable Gate Array (FPGA).

The detecting module may be further configured for: detecting the at least one video source input respectively through at least one corresponding video interface. The at least one video source may include at least one of a Video Graphics Array (VGA) input source, a High Definition Multimedia Interface (HDMI) input source, and a Graphical User Interface (GUI) video input source.

The displaying module may further include a first displaying sub-module.

The first displaying sub-module may be configured for: acquiring the detected at least one video source and video information corresponding to the at least one video source; generating the thumbnails according to the video information corresponding to the at least one video source, and displaying the list of video sources in forms of the thumbnails.

The displaying module may further include a second displaying sub-module.

The second displaying sub-module may be configured for: acquiring the event of selecting the video source from the list of video sources by clicking on a thumbnail corresponding to the video source, switching the present video source to the selected video source, and displaying the present video source in a video picture of a present participant; or, acquiring the event of selecting the video source from the list of video sources by dragging a thumbnail corresponding to the video source, switching the present video source to the selected video source, and displaying the present video source in a video picture of a present participant.

In processing, the first displaying sub-module and the second displaying sub-module may be implemented using a Central Processing Unit (CPU), a Digital Signal Processor (DSP), or a Field-Programmable Gate Array (FPGA).

A displaying device includes a display screen of a touch type or a non-touch type. The displaying device includes:

a display configured for: displaying acquired at least one video source as a list of video sources in forms of thumbnails; acquiring an event of selecting a video source from the list of video sources, switching a present video source to the video source selected from the list of video sources, and displaying the present video source.

The display may include a first displaying unit.

The first displaying unit may be configured for: acquiring the detected at least one video source and video information corresponding to the at least one video source; generating the thumbnails according to the video information corresponding to the at least one video source, and displaying the list of video sources in forms of the thumbnails.

The first displaying unit may be further configured for: in case that the thumbnails are to be generated according to a video stream included in the video information, when a video stream of a video source in the at least one video source is being output normally, generating a thumbnail corresponding to the video source in the at least one video source, and displaying the thumbnail in the list of video sources; when a video stream of a video source in the at least one video source is not being output normally, setting a thumbnail corresponding to the video source in the at least one video source as an icon illustrating content of the video source, and displaying the thumbnail in the list of video sources.

The display may include a second displaying unit.

The second displaying unit may be configured for: acquiring the event of selecting the video source from the list of video sources by clicking on a thumbnail corresponding to the video source, switching the present video source to the selected video source, and displaying the present video source in a video picture of a present participant; or, acquiring the event of selecting the video source from the list of video sources by dragging a thumbnail corresponding to the video source, switching the present video source to the selected video source, and displaying the present video source in a video picture of a present participant.

The list of video sources may be displayed at any location in the display screen, adjacent to the displayed present video source.

According to an embodiment herein, at least one video source presently available is detected; the at least one video source is displayed as a list of video sources in forms of thumbnails; an event of selecting a video source from the list of video sources is acquired, a present video source is switched to the video source selected from the list of video sources, and the present video source is displayed and played. With an embodiment herein, video sources are displayed as a list of video sources in forms of thumbnails, providing a dynamic displaying mode, facilitating selection by a user, such that a video source selected from the list of video sources is switched as the present video source which is then displayed, thus increasing a switching efficiency and avoiding abnormal switching.

DETAILED DESCRIPTION

Implementation of a technical solution herein is further elaborated below with reference to the drawings.

Figure 1:
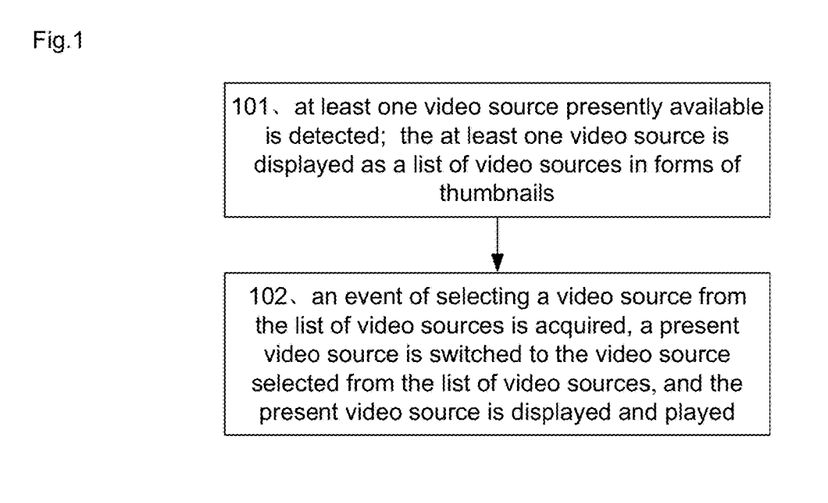
FIG. 1 is a flowchart of a method for video source switching according to an embodiment herein.

A method for video source switching according to an embodiment herein, as shown in FIG. 1, includes steps as follows.

In step 101, at least one video source presently available is detected; the at least one video source is displayed as a list of video sources in forms of thumbnails.

In step 102, an event of selecting a video source from the list of video sources is acquired, a present video source is switched to the video source selected from the list of video sources, and the present video source is displayed and played.

For the embodiment consisting of the steps 101-102, in step 101, the at least one video source presently available may be detected by:

detecting the at least one video source input respectively through at least one corresponding video interface. The at least one video source may include at least one of a Video Graphics Array (VGA) input source, a High Definition Multimedia Interface (HDMI) input source, and a Graphical User Interface (GUI) video input source.

For the embodiment consisting of the steps 101-102, in step 101, the at least one video source may be displayed as a list of video sources in forms of thumbnails by:

acquiring the detected at least one video source and video information corresponding to the at least one video source;

generating the thumbnails according to the video information corresponding to the at least one video source, and displaying the list of video sources in forms of the thumbnails.

The thumbnails may be generated according to the video information corresponding to the at least one video source, and the list of video sources may be displayed in forms of the thumbnails as follows.

In case that the thumbnails are to be generated according to a video stream included in the video information, when a video stream of a video source in the at least one video source is being output normally, a thumbnail corresponding to the video source in the at least one video source may be generated and then displayed in the list of video sources; when a video stream of a video source in the at least one video source is not being output normally, a thumbnail corresponding to the video source in the at least one video source may be set as an icon illustrating content of the video source, and then the thumbnail may be displayed in the list of video sources. That is to say, when a video stream of a video source is not being output normally, no thumbnail corresponding to the video source may be generated and displayed according to the video stream. In this case, the icon illustrating the content of the video source may just be displayed in the list of video sources.

For the embodiment consisting of the steps 101-102, in step 102, the event of selecting the video source from the list of video sources may be acquired, the present video source may be switched to the video source selected from the list of video sources, and the present video source may then be displayed, as follows. The event of selecting the video source from the list of video sources by clicking on a thumbnail corresponding to the video source may be acquired, the present video source may be switched to the selected video source, and then the present video source may be displayed in a video picture of a present participant. Alternatively, The event of selecting the video source from the list of video sources by dragging a thumbnail corresponding to the video source may be acquired, the present video source may be switched to the selected video source, and then the present video source may be displayed in a video picture of a present participant.

Figure 2:
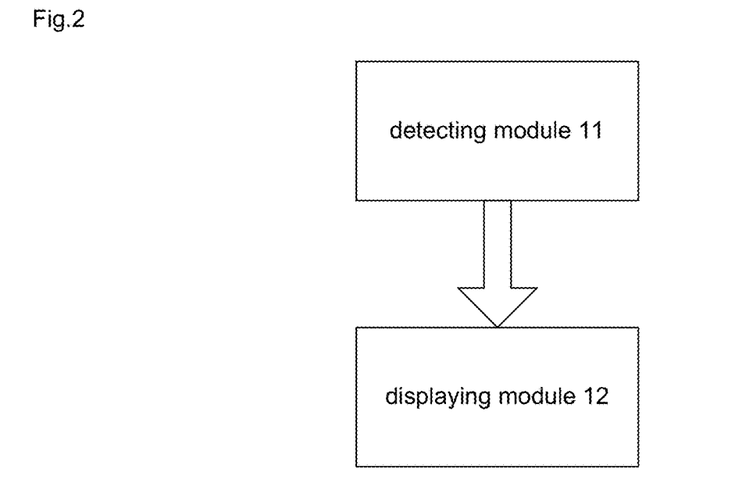
FIG. 2 is a diagram of a structure of a device for video source switching according to an embodiment herein.

A device for video source switching according to an embodiment herein is located in an electronic displaying equipment. The electronic displaying equipment may include a display screen of a touch type or a non-touch type. As shown in FIG. 2, the device for video source switching includes a detecting module 11 and a displaying module 12.

The detecting module 11 may be configured for: detecting at least one video source presently available. The displaying module 12 may be configured for: receiving the at least one video source reported by the detecting module, displaying the at least one video source as a list of video sources in forms of thumbnails; acquiring an event of selecting a video source from the list of video sources, switching a present video source to the video source selected from the list of video sources, and displaying the present video source.

For the embodiment consisting of the detecting module 11 and the displaying module 12, the detecting module 11 may be configured for: detecting the at least one video source input respectively through at least one corresponding video interface. The at least one video source may include at least one of a Video Graphics Array (VGA) input source, a High Definition Multimedia Interface (HDMI) input source, and a Graphical User Interface (GUI) video input source.

For the embodiment consisting of the detecting module 11 and the displaying module 12, the displaying module 12 may include a first displaying sub-module. The first displaying sub-module may be configured for: acquiring the detected at least one video source and video information corresponding to the at least one video source; generating the thumbnails according to the video information corresponding to the at least one video source, and displaying the list of video sources in forms of the thumbnails. The first displaying sub-module may be the display 22 for displaying the list of video sources in FIG. 3.

For the embodiment consisting of the detecting module 11 and the displaying module 12, the displaying module 12 may include a second displaying sub-module. The second displaying sub-module may be configured for: acquiring the event of selecting the video source from the list of video sources by clicking on a thumbnail corresponding to the video source, switching the present video source to the selected video source, and displaying the present video source in a video picture of a present participant; or, acquiring the event of selecting the video source from the list of video sources by dragging a thumbnail corresponding to the video source, switching the present video source to the selected video source, and displaying the present video source in a video picture of a present participant. The second displaying sub-module may be the display 21 for displaying a video of a participant of a video conference in FIG. 3.

A displaying device according to an embodiment herein includes a display screen of a touch type or a non-touch type. The displaying device includes a display configured for: displaying acquired at least one video source as a list of video sources in forms of thumbnails; acquiring an event of selecting a video source from the list of video sources, switching a present video source to the video source selected from the list of video sources, and displaying the present video source.

Figure 3:
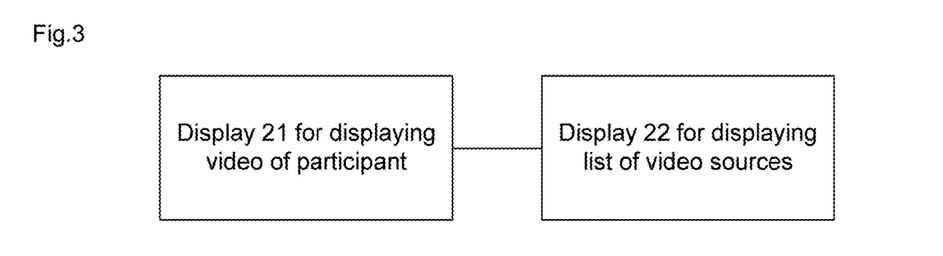
FIG. 3 is a diagram of a structure of a displaying device according to an embodiment herein.

For the display according to the embodiment herein, the display may include a first displaying unit. The first displaying unit may be configured for: acquiring the detected at least one video source and video information corresponding to the at least one video source; generating the thumbnails according to the video information corresponding to the at least one video source, and displaying the list of video sources in forms of the thumbnails. As shown in FIG. 3, the first displaying unit may be the display 22 for displaying the list of video sources.

For the display according to the embodiment herein, the first displaying unit may be configured for: in case that the thumbnails are to be generated according to a video stream included in the video information, when a video stream of a video source in the at least one video source is being output normally, generating a thumbnail corresponding to the video source in the at least one video source, and displaying the thumbnail in the list of video sources; when a video stream of a video source in the at least one video source is not being output normally, setting a thumbnail corresponding to the video source in the at least one video source as an icon illustrating content of the video source, and displaying the thumbnail in the list of video sources.

For the display according to the embodiment herein, the display may include a second displaying unit. The second displaying unit may be configured for: acquiring the event of selecting the video source from the list of video sources by clicking on a thumbnail corresponding to the video source, switching the present video source to the selected video source, and displaying the present video source in a video picture of a present participant; or, acquiring the event of selecting the video source from the list of video sources by dragging a thumbnail corresponding to the video source, switching the present video source to the selected video source, and displaying the present video source in a video picture of a present participant. As shown in FIG. 3, the second displaying unit may be the display 21 for displaying a video of a participant.

For the display according to the embodiment herein, the list of video sources may be displayed at any location in the display screen, adjacent to the displayed present video source.

The displayed present video source may be a video picture of a participant. The list of video sources may be displayed on the right side of the display screen, adjacent to the video picture of the participant. Note that the list of video sources may be displayed anywhere in the screen (such as on the right side of the screen in FIG. 4). When a video source is normal, a thumbnail of the video may serve as the icon of the video source. Otherwise, only an icon expressing information on the video source is displayed.

Embodiments herein are further explained below with examples.

With the solution according to an embodiment herein, which may apply to the field of videoconference, during selecting a mode of displaying multiple conference pictures, a video source presently available can be found automatically, and be displayed as a thumbnail beside the pictures (which is dynamic displaying, in contrast to the existing mode of displaying an icon), implementing dynamic video source switching. In this case, the video source of a picture presently being displayed may be changed by operations including a clicking operation or a dragging operation.

Dynamic video source switching may be implemented by a number of modules, as shown in FIG. 2, including a detecting module 11 and a displaying module 12. The detecting module 11 may: acquire a video source being input to a present terminal, such as a video VGA input source, an HDMI input source, a GUI video input source, etc., and acquire video content corresponding to the video source. Upon detecting a new video source being input, a present list of video sources is updated timely, and reported to the displaying module 12. The displaying module 12 may receive the present list of video sources reported and video information corresponding to a video source thereof. Such information may include but is not limited to: a video format, a resolution, a video stream, etc.

The displaying module 12 may consist of two displaying functions. One function is for displaying the list of video sources. When a stream of a video source turns out to be normal, the stream will be displayed as a thumbnail in the list of video sources. Otherwise when the stream is abnormal, only an icon capable of illustrating content of the video source is displayed. The other function is for displaying video of a participant of the video conference.

Advantages with embodiments herein are as follows. A terminal may be connected to a lot of video sources, such as a mobile camera, VGA 1, HDMI 1, VGA 2, HDMI 2, and the like. When so many video sources are displayed in the list of video sources merely in existing forms of icons, a user may confuse one video source with another, and tend to make an error in video source switching, leading to abnormal switching. With an embodiment herein, video sources are shown as thumbnails, which provides a dynamic video source switching solution, where the user may see what he or she will get, greatly facilitating user operation. That is to say, on one hand, video sources detected by a terminal may be displayed beside the picture(s) as a list of video sources in forms of thumbnails, facilitating real-time video source switching; on the other hand, in the list of video sources displayed, when a video source has a video stream, the video source will be displayed as a thumbnail of the video. When there are a lot of video sources available to the terminal, the thumbnail form provides the user a clear view of available video sources at a glance, such that the user sees what he or she will actually get.

Scenes to which embodiments herein apply are explained with examples below.

Application example: a scene of selecting a mode of displaying multiple conference pictures in the field of videoconference.

Figure 4:
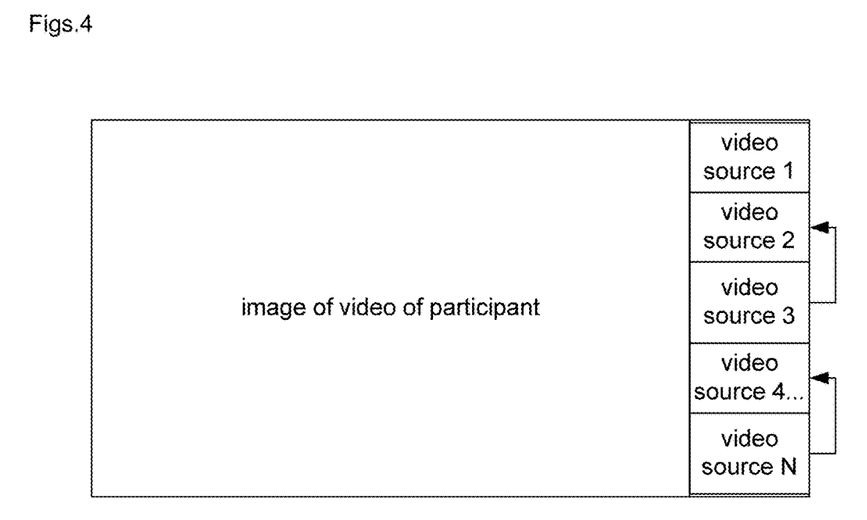
FIG. 4 is a diagram of a displaying interface of a displaying device according to an embodiment herein.

A displaying interface acquired by the displaying device in the example is the picture as shown in FIG. 4. During selecting the mode of displaying multiple conference pictures, a video source presently available can be found automatically, such as the list of video sources formed by video sources 1, 2, . . . , N. In addition, the video sources are displayed as thumbnails on the right side of the picture of an image of a video of a participant. In other scenes, the list of video sources may be displayed anywhere in the displaying interface of the displaying device, such as above, below, or on the right side of the picture of the image of the video of the participant. Video sources are displayed as thumbnails, providing a dynamic displaying effect, in contrast to the existing mode of displaying a static icon. By thumbnail displaying, the picture of an image of a video corresponding to a stream section currently being played, such as a stream section at 10% of the video stream, may be seen. With thumbnail displaying according to the example, in case there are a lot of video sources, visual pictures of video images are provided, and a user not only may differentiate videos from each other, but also may know the part of a present video that is being played, facilitating searching, such that the user may decide, according to a result of the video source searching, whether to switch to another video source or continue playing the present video source, avoiding abnormal video source switching. In the existing mode of displaying a list in the form of icons, one may know only know that there are a number of video sources, while it is difficult to perform differentiation and search, such that it is hard for the user to make a switching decision, leading to frequent switching abnormalities, such as switching away from a video that should be played, or switching to a video that is not intended to be played. In a scene of videoconference with multiple conferees, such a mistake may leave a bad impression, or may even lead to interruption of the conference.

Displaying video sources as thumbnails on the right side of the picture of an image of a video of a participant meets a habit of daily operation, as people generally operate with their right hands. With video sources displayed as thumbnails on the right side, it is convenient for a user to select a video source by dragging and dropping the video source to the picture of the video image of a participant to display the video source, to change the video source of the picture. However, again, thumbnails of video sources may be displayed anywhere on the screen in addition to being displayed on the right side, as many people are left-handed and generally operate with their left hands. Video sources displayed as thumbnails on the left side may facilitate selecting, by a left-handed user, a video source by dragging and dropping the video source to the picture of the video image of a participant to display the video source.

Figure 5:
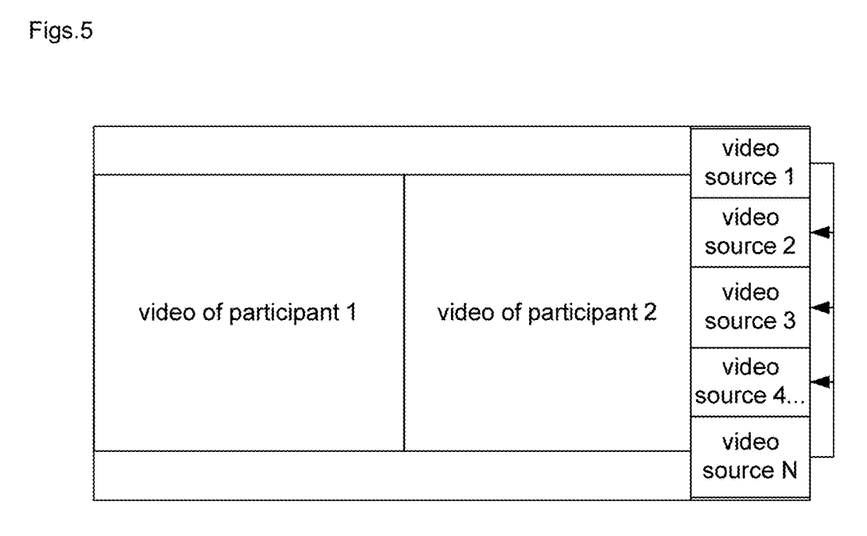
FIG. 5 is a diagram of displaying 2 participants in dynamic video source switching according to an embodiment herein.
Figure 6:
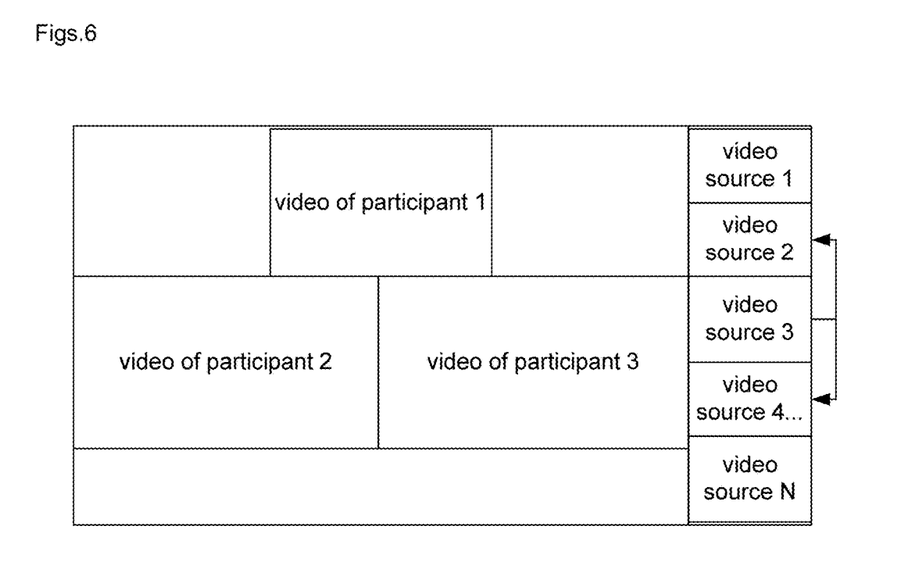
FIG. 6 is a diagram of displaying 3 participants in dynamic video source switching according to an embodiment herein.
Figure 7:
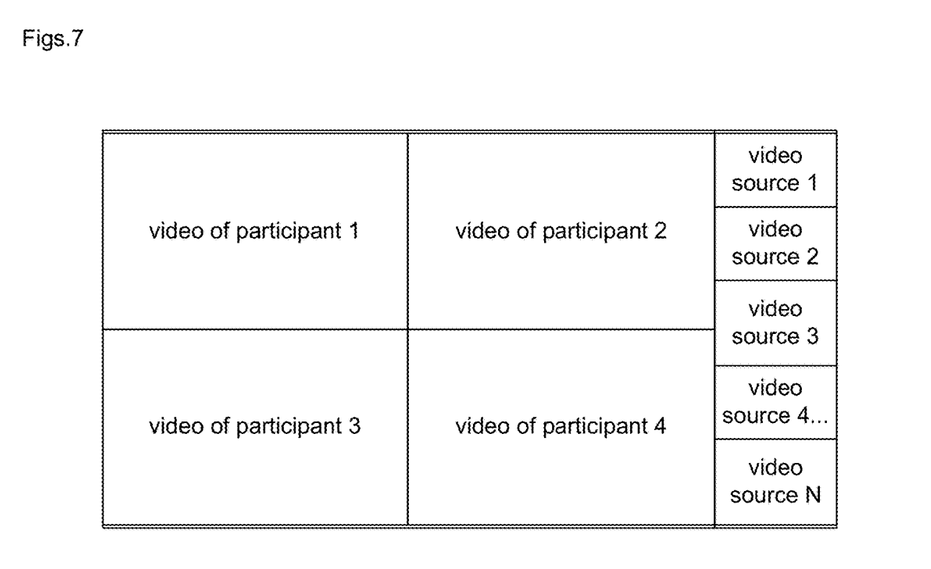
FIG. 7 is a diagram of displaying 4 participants in dynamic video source switching according to an embodiment herein.

Depending on a number of participants and a demand for displaying pictures, there may be multiple layout combinations for the output controlling displaying interface of the displaying device, such as layout combinations in FIG. 5-FIG. 7. An actual operation is not limited to such combinations. Pre-setting may be performed according to the demand, and the displaying device or the displaying module of the device for video source switching may control outputting a displaying interface according to a pre-set value.

FIG. 5 is a diagram of displaying 2 participants in dynamic video source switching according to an embodiment herein. The displaying interface may include: the list of video sources formed by video sources 1, 2, . . . , N. In addition, the video sources are displayed as thumbnails on the right side of the picture of an image of a video of a participant. The displaying interface may further include the picture of video images of 2 participants.

FIG. 6 is a diagram of displaying 3 participants in dynamic video source switching according to an embodiment herein. The displaying interface may include: the list of video sources formed by video sources 1, 2, . . . , N. In addition, the video sources are displayed as thumbnails to the right side of the picture of video images of the participants. The displaying interface may further include the picture of video images of 3 participants.

FIG. 7 is a diagram of displaying 4 participants in dynamic video source switching according to an embodiment herein. The displaying interface may include: the list of video sources formed by video sources 1, 2, . . . , N. In addition, the video sources are displayed as thumbnails to the right side of the picture of video images of the participants. The displaying interface may further include the picture of video images of 4 participants.

For the different numbers of participants in FIG. 5-FIG. 7, in displaying with the entire screen, a video source may be changed through the list of video sources displayed to the right to implement video source switching. A video source may be changed by way of, but not limited to, clicking, dragging, etc. By double-clicking on a video in the list of video sources displayed to the right, the video may be switched into the picture of the video images of the participants. Alternatively, by dragging, a dragged video may be switched into the picture of the video images of the participants.

When a video source is displayed normally, the thumbnail of the video may be set as an icon in the list of video sources. When a video source is displayed abnormally, such as when the video is being buffered, the video cannot be played even when it is switched into the picture of the video images of the participants. In this case, instead of displaying the video thumbnail, only an icon capable of expressing information on the video source is displayed.

What described are merely embodiments herein, and are not intended to limit the scope of the present disclosure.

INDUSTRIAL APPLICABILITY

According to an embodiment herein, at least one video source presently available is detected; the at least one video source is displayed as a list of video sources in forms of thumbnails; an event of selecting a video source from the list of video sources is acquired, a present video source is switched to the video source selected from the list of video sources, and the present video source is displayed and played. With an embodiment herein, video sources are displayed as a list of video sources in forms of thumbnails, providing a dynamic displaying mode, facilitating selection by a user, such that a video source selected from the list of video sources is switched as the present video source which is then displayed, thus increasing a switching efficiency and avoiding abnormal switching.

The invention claimed is:

1. A method for video source switching, the method comprising:

detecting at least one video source presently available;

displaying the at least one video source as a list of video sources in forms of thumbnails; acquiring an event of selecting a video source from the list of video sources, switching a present video source to the video source selected from the list of video sources, and displaying the present video source, wherein the displaying the at least one video source as a list of video sources in forms of thumbnails comprises:

acquiring the detected at least one video source and video information corresponding to the at least one video source;

generating the thumbnails according to the video information corresponding to the at least one video source, and displaying the list of video sources in forms of the thumbnails, wherein the video information corresponding to the at least one video source comprises a video format, a resolution, and a video stream of each video source in the at least one video source, wherein the generating the thumbnails according to the video information corresponding to the at least one video source comprises:

when a video stream of a video source in the at least one video source is being output normally, generating, according to the video stream of the video source, a thumbnail corresponding to the video source that displays an image of the video corresponding to a stream section currently being played; when a video stream of a video source in the at least one video source is not being output normally, setting a thumbnail corresponding to the video source as an icon expressing information on the video source.

2. The method according to claim 1, wherein the detecting at least one video source presently available comprises:

detecting the at least one video source input respectively through at least one corresponding video interface, the at least one video source comprising at least one of a Video Graphics Array (VGA) input source, a High Definition Multimedia Interface (HDMI) input source, and a Graphical User Interface (GUI) video input source.

3. The method according to claim 1, wherein the acquiring an event of selecting a video source from the list of video sources, switching a present video source to the video source selected from the list of video sources, and displaying the present video source comprises:

acquiring the event of selecting the video source from the list of video sources by clicking on a thumbnail corresponding to the video source, switching the present video source to the selected video source, and displaying the present video source in a video picture of a present participant;

or, acquiring the event of selecting the video source from the list of video sources by dragging a thumbnail corresponding to the video source, switching the present video source to the selected video source, and displaying the present video source in a video picture of a present participant.

4. A device for video source switching, the device being located in an electronic displaying equipment, the electronic displaying equipment comprising a display screen of a touch type or a non-touch type, the device comprising:
- a detecting module configured for: detecting at least one video source presently available;
- a displaying module configured for: receiving the at least one video source reported by the detecting module, displaying the at least one video source as a list of video sources in forms of thumbnails; acquiring an event of selecting a video source from the list of video sources, switching a present video source to the video source selected from the list of video sources, and displaying the present video source,
- wherein the displaying module further comprises a first displaying sub-module configured for:
- acquiring the detected at least one video source and video information corresponding to the at least one video source; generating the thumbnails according to the video information corresponding to the at least one video source, and displaying the list of video sources in forms of the thumbnails,
- wherein the video information corresponding to the at least one video source comprises a video format, a resolution, and a video stream of each video source in the at least one video source,
- wherein the first displaying sub-module is configured for generating the thumbnails according to the video information corresponding to the at least one video source by:
- when a video stream of a video source in the at least one video source is being output normally, generating, according to the video stream of the video source, a thumbnail corresponding to the video source that displays an image of the video corresponding to a stream section currently being played; when a video stream of a video source in the at least one video source is not being output normally, setting a thumbnail corresponding to the video source as an icon expressing information on the video source.

5. The device according to claim 4, wherein the detecting module is further configured for: detecting the at least one video source input respectively through at least one corresponding video interface, the at least one video source comprising at least one of a Video Graphics Array (VGA) input source, a High Definition Multimedia Interface (HDMI) input source, and a Graphical User Interface (GUI) video input source.

6. The device according to claim 4, wherein the displaying module further comprises a second displaying sub-module configured for:
- acquiring the event of selecting the video source from the list of video sources by clicking on a thumbnail corresponding to the video source, switching the present video source to the selected video source, and displaying the present video source in a video picture of a present participant; or, acquiring the event of selecting the video source from the list of video sources by dragging a thumbnail corresponding to the video source, switching the present video source to the selected video source, and displaying the present video source in a video picture of a present participant.

7. A displaying device, the displaying device comprising a display screen of a touch type or a non-touch type, the displaying device comprising:
- a display configured for: displaying acquired at least one video source as a list of video sources in forms of thumbnails; acquiring an event of selecting a video source from the list of video sources, switching a present video source to the video source selected from the list of video sources, and displaying the present video source,
- wherein the display comprises a first displaying unit configured for:
- acquiring the detected at least one video source and video information corresponding to the at least one video source; generating the thumbnails according to the video information corresponding to the at least one video source, and displaying the list of video sources in forms of the thumbnails,
- wherein the video information corresponding to the at least one video source comprises a video format, a resolution, and a video stream of each video source in the at least one video source,
- wherein the first displaying unit is further configured for: when a video stream of a video source in the at least one video source is being output normally, generating, according to the video stream of the video source, a thumbnail corresponding to the video source that displays an image of the video corresponding to a stream section currently being played; when a video stream of a video source in the at least one video source is not being output normally, setting a thumbnail corresponding to the video source as an icon expressing information on the video source.

8. The device according to claim 7, wherein the display comprises a second displaying unit configured for:
- acquiring the event of selecting the video source from the list of video sources by clicking on a thumbnail corresponding to the video source, switching the present video source to the selected video source, and displaying the present video source in a video picture of a present participant; or, acquiring the event of selecting the video source from the list of video sources by dragging a thumbnail corresponding to the video source, switching the present video source to the selected video source, and displaying the present video source in a video picture of a present participant.

9. The device according to claim 7, wherein the list of video sources is displayed at any location in the display screen, adjacent to the displayed present video source.

10. The method according to claim 2, wherein the acquiring an event of selecting a video source from the list of video sources, switching a present video source to the video source selected from the list of video sources, and displaying the present video source comprises:
- acquiring the event of selecting the video source from the list of video sources by clicking on a thumbnail corresponding to the video source, switching the present video source to the selected video source, and displaying the present video source in a video picture of a present participant;
- or,
- acquiring the event of selecting the video source from the list of video sources by dragging a thumbnail corresponding to the video source, switching the present video source to the selected video source, and displaying the present video source in a video picture of a present participant.

11. The device according to claim 5, wherein the displaying module further comprises a second displaying sub-module configured for:
- acquiring the event of selecting the video source from the list of video sources by clicking on a thumbnail corresponding to the video source, switching the present video source to the selected video source, and displaying the present video source in a video picture of a present participant; or, acquiring the event of selecting the video source from the list of video sources by dragging a thumbnail corresponding to the video source, switching the present video source to the selected video source, and displaying the present video source in a video picture of a present participant.

* * * * *